United States Patent
Son et al.

(10) Patent No.: US 11,586,886 B2
(45) Date of Patent: Feb. 21, 2023

(54) NEURAL NETWORK APPARATUS AND METHOD WITH BITWISE OPERATION

(71) Applicant: Samsung Electronics Co., Ltd., Suwon-si (KR)

(72) Inventors: Jinwoo Son, Seoul (KR); Changyong Son, Anyang-si (KR); Seohyung Lee, Seoul (KR); Sangil Jung, Suwon-si (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 16/542,803

(22) Filed: Aug. 16, 2019

(65) Prior Publication Data

US 2020/0202200 A1 Jun. 25, 2020

(30) Foreign Application Priority Data

Dec. 24, 2018 (KR) .................. 10-2018-0168566

(51) Int. Cl.
*G06N 3/063* (2006.01)
*G06F 17/15* (2006.01)
*G06F 9/38* (2018.01)

(52) U.S. Cl.
CPC .......... *G06N 3/063* (2013.01); *G06F 9/3887* (2013.01); *G06F 17/15* (2013.01)

(58) Field of Classification Search
None
See application file for complete search history.

(56) References Cited

U.S. PATENT DOCUMENTS

| 8,345,984 B2* | 1/2013 | Ji .................. G06V 10/454 382/156 |
| 9,582,726 B2 | 2/2017 | Pan et al. |
| 11,275,998 B2* | 3/2022 | Langhammer .......... G06F 7/501 |
| 2017/0221176 A1 | 8/2017 | Munteanu et al. |
| 2017/0357891 A1 | 12/2017 | Judd et al. |
| 2018/0018566 A1 | 1/2018 | Ehrman et al. |

(Continued)

FOREIGN PATENT DOCUMENTS

KR 10-1687813 B1 12/2016
KR 10-2018-0050928 A 5/2018
(Continued)

OTHER PUBLICATIONS

Svensson, B., et. al., Execution of Neural Network Algorithms on an array or Bit-Serial Processors, 1990, IEEE, pp. 501-505. (Year: 1990).*

(Continued)

*Primary Examiner* — Eric Coleman
(74) *Attorney, Agent, or Firm* — NSIP Law

(57) ABSTRACT

A processor-implemented neural network processing method includes: obtaining a kernel bit-serial block corresponding to first data of a weight kernel of a layer in a neural network; generating a feature map bit-serial block based on second data of one or more input feature maps of the layer; and generating at least a portion of an output feature map by performing a convolution operation of the layer using a bitwise operation between the kernel bit-serial block and the feature map bit-serial block.

24 Claims, 12 Drawing Sheets

(56) References Cited

U.S. PATENT DOCUMENTS

2018/0046894 A1      2/2018  Yao
2019/0043193 A1*     2/2019  Odaibo ................ G06N 3/0445
2019/0303103 A1*    10/2019  Hah ........................ G06F 7/523

FOREIGN PATENT DOCUMENTS

KR    10-2018-0052900 A    5/2018
KR    10-2018-0088258 A    8/2018

OTHER PUBLICATIONS

Umuroglu, Y. et. al., Bismo: A Scalable Bit-Serial Matrix Multiplication Overlay for Reconfigurable Computing, IEEE, 2018 28th Intl. Conf on Field Programmable Logic and Applications Aug. 27-31, 2018, added to IEEE Xplore Dec. 6, 2018, IEEE, pp. 307-314. (Year: 2018).*

Horowitz M., "Computing's Energy Problem: (and what we can do about it", *IEEE International Solid-State Circuits Conference*, 2014, pp. 1-46 (46 pages in English).

Zhou S. et al., "DoReFa-Net: Training Low Bitwidth Convolutional Neural Networks with Low Bitwidth Gradients", *arXiv preprint arXiv:1606.06160*, Jun. 2016, pp. 1-13 (13 pages in English).

Zhuang B. et al., "Towards Effective Low-Bitwidth Convolutional Neural Networks", *Proceedings of the IEEE Conference on Computer Vision and Pattern Recognition*, 2018, pp. 7920-7928 (9 pages in English).

Tulloch, Andrew et al., "High performance ultra-low-precision convolutions on mobile devices." *arXiv preprint arXiv:1712.02427*, 2017 (5 pages in English).

Cowan, Meghan, et al. "Automating Generation of Low Precision Deep Learning Operators." *arXiv preprint arXiv:1810.11066*, 2018 (10 pages in English).

Extended European Search Report dated Apr. 28, 2020 in counterpart European Patent Application No. 19201997.4 (6 pages in English).

* cited by examiner

NEURAL NETWORK APPARATUS AND METHOD WITH BITWISE OPERATION

CROSS-REFERENCE TO RELATED APPLICATIONS

This application claims the benefit under 35 USC 119(a) of Korean Patent Application No. 10-2018-0168566 filed on Dec. 24, 2018, in the Korean Intellectual Property Office, the entire disclosure of which is incorporated herein by reference for all purposes.

BACKGROUND

1. Field

The following description relates to a neural network apparatus and method with bitwise operation.

2. Description of Related Art

A technological automation of recognition, for example, has been implemented through processor-implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network processing method includes: obtaining a kernel bit-serial block corresponding to first data of a weight kernel of a layer in a neural network; generating a feature map bit-serial block based on second data of one or more input feature maps of the layer; and generating at least a portion of an output feature map by performing a convolution operation of the layer using a bitwise operation between the kernel bit-serial block and the feature map bit-serial block.

The kernel bit-serial block and the feature map bit-serial block may respectively include bits having same bit positions.

The kernel bit-serial block may include bits corresponding to one of a plurality of bit positions of elements of kernel maps of the weight kernel, and the obtaining may include obtaining other kernel bit-serial blocks, calculated independently from the kernel bit-serial block, that each include bits corresponding to a bit position of the plurality of bit positions different than the one of the plurality of bit positions.

The plurality of bit positions may include a most significant bit (MSB) through a least significant bit (LSB).

The kernel bit-serial block and the feature map bit-serial block may be respectively extracted from the first data in a channel direction of the weight kernel and extracted from the second data in a channel direction of the one or more input feature maps, through an interleaving method, or the kernel bit-serial block and the feature map bit-serial block may be respectively extracted from the first data in a planar direction of the weight kernel and extracted from the second data in a planar direction of two or more of the one or more input feature maps, through a planar method.

The kernel bit-serial block and the feature map bit-serial block may be based on a reference bitwidth for single instruction multiple data (SIMD) processing.

A space that does not satisfy the reference bitwidth in the kernel bit-serial block and the feature map bit-serial block may be filled with 0.

The reference bitwidth may be any one of 32 bits, 64 bits, and 128 bits.

The bitwise operation may include a logical AND operation and a popcount operation.

The kernel bit-serial block and the feature map bit-serial block may have a same dimension.

The performing of the convolution operation may include: performing a logical AND operation between the kernel bit-serial block and the feature map bit-serial block; performing a popcount operation on a result value of the logical AND operation; and determining a result value of the convolution operation based on a result value of the popcount operation.

The determining of the result value of the convolution operation may include: performing bit positioning based on the result value of the popcount operation.

The bit positioning may be performed based on a bit position of the first data.

Each of the first data and the second data may be represented by a bitwidth of less than 8 bits.

The obtaining of the kernel bit-serial block may include: obtaining the kernel bit-serial block prestored in a memory from the memory; or generating the kernel bit-serial block based on the first data.

A non-transitory computer-readable storage medium may store instructions that, when executed by one or more processors, cause the one or more processors to perform the processing method.

In another general aspect, a neural network processing apparatus includes: one or more processors configured to: obtain a kernel bit-serial block corresponding to first data of a weight kernel of a layer in a neural network; generate a feature map bit-serial block based on second data of one or more input feature maps of the layer; and generate at least a portion of an output feature map by performing a convolution operation of the layer using a bitwise operation between the kernel bit-serial block and the feature map bit-serial block.

The kernel bit-serial block and the feature map bit-serial block may respectively include bits having same bit positions.

The kernel bit-serial block and the feature map bit-serial block may be based on a reference bitwidth for single instruction multiple data (SIMD) processing.

The bitwise operation may include a logical AND operation and a popcount operation.

For the performing of the convolution operation, the one or more processors may be configured to perform a logical AND operation between the kernel bit-serial block and the feature map bit-serial block, perform a popcount operation on a result value of the logical AND operation, and determine a result value of the convolution operation based on a result value of the popcount operation.

A memory may store instructions that, when executed by the one or more processors, configure the one or more processors to perform the obtaining of the kernel bit-serial block, the generating of the feature map bit-serial block, and the generating of at least the portion of the output feature map.

In another general aspect a processor-implemented neural network processing method includes: receiving a kernel of a neural network layer and a feature map to be processed by the neural network layer; obtaining a kernel bit-serial block including binary element values corresponding to elements of the kernel that include a bit of a predetermined bit position from among bit positions of the elements of the kernel; obtaining a feature map bit-serial block including binary element values corresponding to elements of the feature map that include a bit of a predetermined bit position from among bit positions of the elements of the feature map; and generating at least a portion of an output feature map by performing a convolution operation of the neural network layer using a bitwise operation between the feature map bit-serial block and the kernel bit-serial block.

The obtaining of the feature map bit-serial block may include generating a feature map bit-serial block for each of the bit positions of the elements of the feature map, and the obtaining of the kernel bit-serial block may include generating a kernel bit-serial block for each of the bit positions of the elements of the kernel.

Other features and aspects will be apparent from the following detailed description, the drawings, and the claims.

Figure 1:
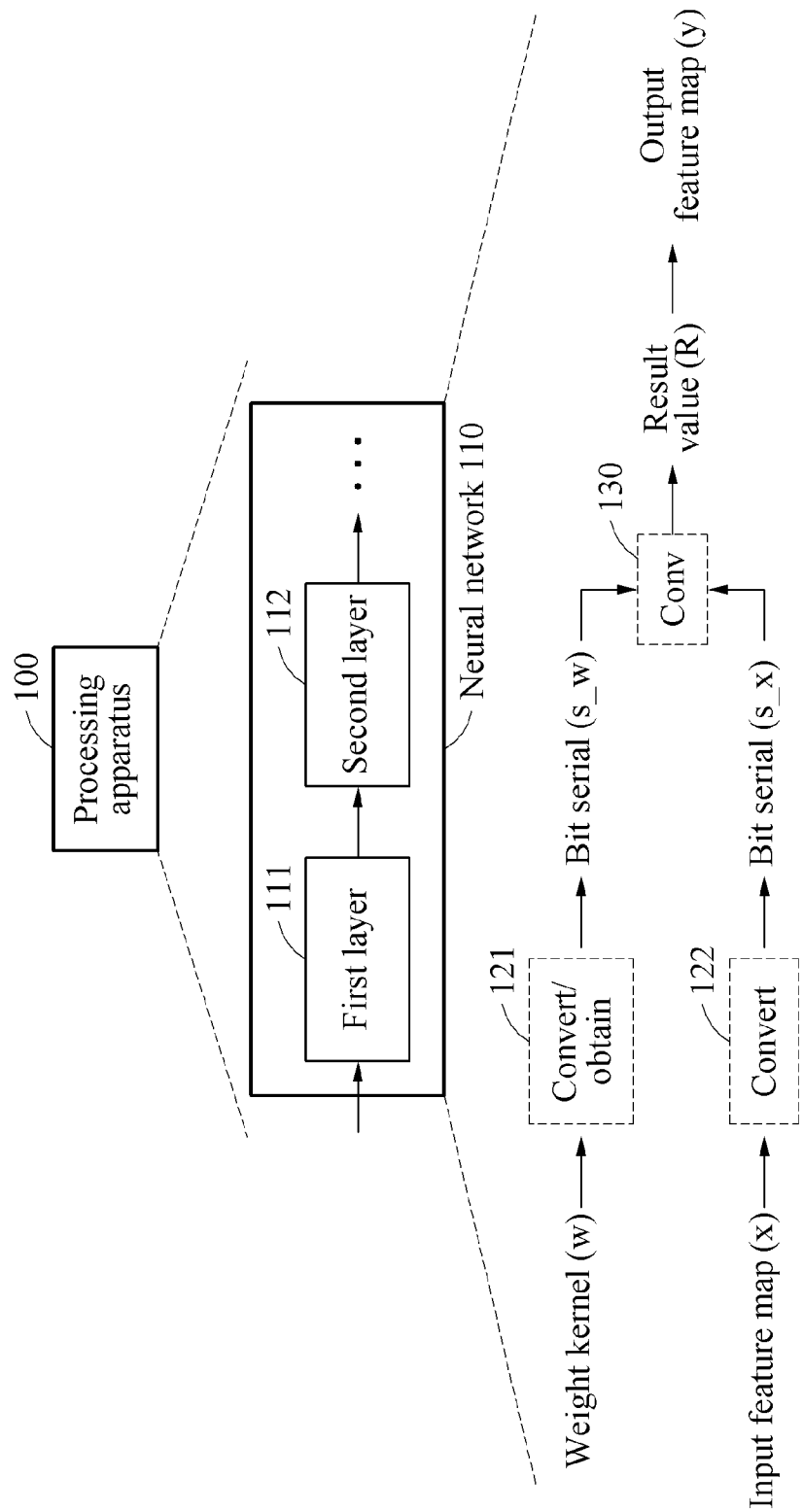
FIG. 1 illustrates an example of a processing apparatus using a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a processing apparatus using a neural network. Hereinafter, the processing apparatus using a neural network may also be referred to as a neural network processing apparatus (or a processing apparatus, for short).

For example, in the present disclosure, apparatuses may be described as implementing convolutional neural networks (CNNs), e.g., based on convolutions using previously trained (hereinafter "original") parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the CNN, as well as use the trained CNN and/or selectively implemented CNN in an example, filtering, detection, recognition, rejection, verification, classification, or other such 'interpretative' operations or objectives the respective layers or overall CNN are trained to perform.

Referring to FIG. 1, a neural network apparatus may acquire such trained parameters corresponding to one or more layers included in a neural network, e.g., the herein discussed example CNN type of neural network, noting that embodiments are not limited thereto. For example, the neural network apparatus may acquire parameters, e.g., as determined by the neural network apparatus during example training of the neural network by the neural network apparatus, from memory, or through external request or provision. Additionally, the neural network apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The neural network apparatus may also be provided or made available the kernel, kernel element, and/or other connection weight vectors, matrix or matrices, or other format kernels, kernel elements, and/or connection weights, as a result of the example training of the neural network by the neural network apparatus or by another processing apparatus or server, for example. The neural network apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer, e.g., where the hidden layer is the example convolutional layer, and where additional hidden layers may exist for feed-forward operations, as non-limiting examples. In such examples, and depending on the architecture of the neural network, nodes included in neighboring layers may be selectively connected according to respective connections, e.g., which may or may not be weighted. For example, the neural network may be implemented by the aforementioned processor(s), i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed filtering, detection, recognition, verification, or rejection, such as image recognition or verification, translation or rejection, or input data binary or multi-class classification, clustering, pattern observation, transformation, and/or regression, as well as any other trained objective of the neural network. Thus, as a non-limiting examples, in varying embodiments, the neural network may be trained for image or object detection, recognition, identification, rejection, or discrimination. Thus, based on the training data and desired interpretation objective, the architecture, selective connections between neighboring nodes and/or kernels, kernel elements, or other connections within layers may be varied during training by the neural network apparatus until the neural network is trained to a desired acceptability for the desired interpretation objective. For example, convolutional (or CNN) layers of the neural network may be trained for image or object filtering, detection, recognition, verification, or rejection, and thus the respective convolutional kernel elements, e.g., for varying feature extractions through feature kernels, may be trained to an original desired acceptability for the image or object filtering, detection, recognition, verification, or rejection operations. The neural network may also include a different type of neural network and merely include one or more convolutional layers, e.g., for selective feature extraction, for other objectives. Thus, herein, though embodiments may be discussed from the perspective of a neural network apparatus, such reference to CNNs is not intended to be limiting of the apparatus to only implementing CNNs. Returning to the training of the neural network, the resultant kernels, kernel elements, and/or other connection weights of the trained neural network may be referred to as parameters of the neural network, e.g., demonstrated as at least trained kernel elements of a convolutional layer or operation of the CNN. For example, the neural network may be trained based on the labeled input image information or desired corresponding output images, filtering, classifications, or geometric parameters, such as through a backpropagation algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neural network may be stored in a memory of the recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. As noted above, herein such trained kernels, or kernel elements, will be referred to as "original" weights. The stored trained neural network may further include hyperparameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional (e.g., inclusive of stride and/or padding information), de-convolutional, or pooling layers, as only examples. The hyper-parameters may further include information of the configuration and values of any bias and/or contextual nodes in the neural network, corresponding activation functions of the nodes, types of nodes, such as long short-term memory nodes, gated linear unit nodes, or merely nodes configured to perform a single activation function for a summation of inputs, and define any or any further recurrent structures of the neural network, which may vary depending on embodiment and interpretation objective of the trained neural network.

Thus, referring to FIG. 1, a processing apparatus 100 may process an operation of a neural network 110. The operation of the neural network 110 may include, for example, recognizing or verifying an object in an input image. At least a portion of processing operations involved with the neural network 110 to be described hereinafter are embodied by hardware (e.g., a neuromorphic processor), or a combination of hardware and instructions, such as one or more neural processors (e.g., one or more neural processors implementing instructions stored in a memory).

The neural network 110 may include a convolutional neural network (CNN). The neural network 110 may perform object recognition and object verification by mapping input data and output data which have a nonlinear relationship, based on deep learning. The deep learning may refer to a machine learning method used to recognize an image or voice (or speech) from a big dataset. The deep learning may be construed as a problem-solving process in optimization to locate a point at which energy or loss is minimized while training the neural network 110 using prepared training data. The deep learning may be classified into supervised learning and unsupervised learning, through which weights corresponding to the architecture or model of the neural network 110 may be obtained. Through such obtained weights or elements of kernel(s), the input data and the output data may be mapped according to the trained objective of the neural network.

Similar to the above, the neural network 110 may include a plurality of layers which includes an input layer, at least one hidden layer, and an output layer. For example, as illustrated in FIG. 1, a first layer 111 and a second layer 112 included in the neural network 110 may be at least a portion of the plurality of layers. As examples, the first layer 111 may represent the input layer and the second layer 112 may represent the at least one hidden layer, or the first layer 111 and the second layer 112 may each represent a hidden layer of the at least one hidden layer. Although the two layers 111 and 112 are illustrated in the example of FIG. 1, the neural network 110 may include more layers in addition to the two layers 111 and 112.

In the CNN, data input to each layer may be referred to as an input feature map or volume, and data output from each layer may be referred to as an output feature map or volume. According to an example, the output feature map or volume of a layer may correspond to a result of a convolution operation in the layer performed on an input feature map or volume received by the layer as an input (e.g., received from a previous layer), or a result of processing an activation function in each layer. The example input feature map, resulting from a previous activation of a previous layer, for example, and the example output feature map may be referred to as activation data. For example, a result of a convolution operation in each layer or a result of processing an activation function in each layer may also be referred to as activation data. In addition, an input feature map in the input layer may correspond to image data of an input image.

To process the operation of the neural network 110, the processing apparatus 100 may perform a convolution operation between an input feature map and a weight kernel for each layer, and generate an output feature map based on a result of the convolution operation. The weight kernel may have multiple channels, corresponding to the number of channels of the input feature volume, and there may further be multiple weight kernels resulting in the generation of an output feature volume of multiple channels. In the CNN, the deep learning may be performed on convolutional layers. The processing apparatus 100 may generate the output feature map by applying an activation function to the result of the convolution operation. The activation function may include, for example, sigmoid, hyperbolic tangent (tanh), and rectified linear unit (ReLU). The neural network 110 may be assigned with nonlinearity by this activation function. The neural network 110 may have a capacity sufficient to implement a function, when a width and a depth of the neural network 110 are sufficiently large. The neural network 110 may achieve optimal performance when the neural network 110 learns or is trained with a sufficiently large amount of training data through a training process, as discussed above.

The processing apparatus 100 may perform a bitwise operation-based convolution using a bit serial of a weight kernel and a bit serial of an input feature map. Although the following description focuses on a bitwise operation-based convolution on the first layer 111, such bitwise operation-based convolution may be performed on each of convolutional layers in the neural network 110.

In the example of FIG. 1, the processing apparatus 100 may convert a weight kernel w of the first layer 111 and an input feature map x of the first layer 111 to a bit serial s_w and a bit serial s_x, respectively, in blocks 121 and 122. For example, the processing apparatus 100 may respectively convert the weight kernel w and the input feature map x to the bit serial s_w and the bit serial s_x by slicing the weight kernel w and the input feature map x. In a preprocessing process to adjust a bit level of the weight kernel w and the input feature map x to be a preset bit level, the processing apparatus 100 may quantize the weight kernel w and the input feature map x, and convert the quantized weight kernel w and the quantized input feature map x to the bit serial s_w and the bit serial s_x, respectively. In this example, the preset bit level may correspond to a low bitwidth. The low bitwidth may be a bitwidth of less than 8 bits, for example, a bitwidth of 4 bits and/or a bitwidth of 2 bits.

The bit serial s_w and the bit serial s_x may be extracted in a channel direction of the weight kernel w and the input feature map x, e.g., where the weight kernel w and the input feature map x are volumes of multiple channels, through an interleaving method, or in a planar direction of the weight kernel w and the input feature map x through a planar method. For example, in a case in which the weight kernel w is trained in advance, the bit serial s_w may be obtained through conversion based on the trained weight kernel w and then stored in a memory. In this example, the processing apparatus 100 may obtain the bit serial s_w from the memory instead of converting the weight kernel w to the bit serial s_w in block 121.

A weight kernel may be determined in advance. Herein, "in advance" may indicate before the neural network 110 starts (e.g., before the neural network 110 starts an inference operation to perform operations using the first layer 111 and the second layer 112). That the neural network 110 starts may indicate that the neural network 110 is ready for the inference. For example, that the neural network 110 starts may indicate that the neural network 110 is loaded in the memory, or that input data for the inference is input to the neural network 110 after the neural network 110 is loaded in the memory.

An element may represent unit data included in a weight kernel and activation data. For example, in a case in which a weight kernel has a K*K*C dimension, the weight kernel may include K*K*C elements. An element of a weight kernel may correspond to a weight value, and an element of activation data may correspond to an activation value. Elements of a weight kernel and activation data may be represented by of a preset bitwidth. In the foregoing example, the K*K*C elements of the weight kernel may be represented by Z-bit. Elements of a weight kernel and elements of activation data may be represented by a same bitwidth or different bitwidths.

In addition, the converting of the weight kernel w to the bit serial s_w by slicing the weight kernel w may include dividing elements of the weight kernel w by each of Z bit positions to configure the bit serial s_w. Thus, the bit serial s_w may include the elements of the weight kernel w divided by each of the Z bit positions. For example, the bit serial s_w may include Z bit-serial blocks including a bit-serial block corresponding to a most significant bit (MSB) through a bit-serial bock corresponding to a least significant bit (LSB). The Z bit-serial blocks may include K*K*C bits having same bit positions. The bit serial s_x may have a data structure corresponding to that of the bit serial s_w.

The processing apparatus 100 may perform a convolution operation based on a bitwise operation between the bit serial s_w and the bit serial s_x in block 130. The bitwise operation may refer to an operation between bit serials performed by bit unit. For example, the bitwise operation may include a logical AND operation and a popcount operation (e.g., a population count or popcnt operation to determine how many "1" bits an array contains).

The convolution operation may be calculated based on an inner product of two vectors. Under the assumption that the bit serial s_w is an integer vector of an M-bit fixed-point representation, the bit serial s_w may be represented by Equation 1, for example.

$$s\_w = \sum_{m=0}^{M-1} c_m(s\_w)2^m \quad \text{Equation 1}$$

In Equation 1, cm denotes a binary vector, and each element of cm(s_w) denotes a bit located in a position of 2 m among elements of the bit serial s_w. Similarly, under the assumption that the bit serial s_x is an integer vector of a K-bit fixed-point representation, the bit serial s_x may be represented by Equation 2, for example.

$$s\_x = \sum_{k=0}^{K-1} c_k(s\_x)2^k \quad \text{Equation 2}$$

The inner product between the bit serial s_w and the bit serial s_x may be calculated as represented by Equation 3, for example.

$$s\_w \cdot s\_x = \sum_{m=0}^{M-1}\sum_{k=0}^{K-1} 2^{m+k} popcnt \quad \text{Equation 3}$$

[and $(c_m(s\_w), c_k(s\_x))$]

For example, in a case in which s_w, s_x is a vector configured by {−1, 1}, a logical xnor operation may be used in lieu of the logical AND operation. In such case, a portion of Equations 1 through 3 may be changed.

In an example, data corresponding to the weight kernel w and data corresponding to the input feature map x may be represented by a low bitwidth. In this example, the low bitwidth may indicate a bitwidth less than 8 bits, for example, a bitwidth of 4 bits and/or a bitwidth of 2 bits. The data corresponding to the weight kernel w may include a weight, and the data corresponding to the input feature map x may include an activation. The weight and the activation may be represented by a same bitwidth or different bitwidths.

A convolution operation may be performed by data loading and by an operation using an arithmetic logic unit (ALU). In a typical convolution operation using the ALU and a higher bitwidth of data, a great amount of energy may be consumed to load data, and thus a lower bitwidth of data may be more effective in terms of energy consumption. In an example of the present disclosure, a network operating at a low bit level may be used, and it may advantageously exhibit performance corresponding to a full precision even with a low bit level, for example, 4-bit.

A bitwise operation may be used to effectively process low bitwidth data. A minimum data unit that is determined to be processed may be a character with an 8-bit size. Thus, when processing data, data having a bitwidth of less than 8 bits may be stored in an 8-or greater-bit container and then be processed. For example, in a case in which a typical convolution operation between an element of a weight kernel with a bitwidth of 4 bits and an element of an input feature map with a bitwidth of 4 bits is performed based on a multiply-accumulate (MAC) operation, an 8-bit memory space may need to be assigned to each of the element of the weight kernel with the bitwidth of 4 bits and the element of the input feature map with the bitwidth of 4 bits. Thus, in implementing the typical convolution operation, a 4-bit memory space of the 8-bit memory space may be wasted.

However, in an example of the present disclosure, when each of the weight kernel and the input feature map is represented by a bit serial, utilization of a memory space may be improved. This is at least because the bit serial may have a length greater than or equal to 8 bits. In the foregoing example of the present disclosure, each of the Z bit-serial blocks may include the K*K*C single bits. Thus, an operation may be performed with the 8-bit container being filled. As utilization of a container space increases, as in the foregoing example of the present disclosure, a greater amount of data may be loaded and processed at once, and thus the number of memory loadings and the number of operations may decrease. Thus, compared to the typical convolution operation including the MAC operation, the bitwise operation-based convolution operation of the example of the present disclosure may be more effective in terms of utilization of a memory space and computing energy. Such efficient use of memory space and computing energy may be especially advantageous in a limited resource environment such as a mobile terminal.

In an example, the bit serial s_w and the bit serial s_x may be based on a reference bitwidth for single instruction multiple data (SIMD) processing. The SIMD processing may be a data processing method that concurrently processes multiple values by a single instruction. The reference bitwidth may be, for example, one of 32 bits, 64 bits, and 128 bits. For example, in a case of 128-bit SIMD, 128-bit data may be processed by a single instruction. In a case in which there is a space that is not satisfy the reference bitwidth in the bit serial s_w and the bit serial s_x, the space may be filled with 0 for the SIMD processing, as will be described hereinafter.

In the example of FIG. 1, the processing apparatus 100 may perform the convolution operation based on the bitwise operation in block 130 and may determine a result value R of the convolution operation. The processing apparatus 100 may determine an output feature map y of the first layer 111 based on the result value R. For example, the weight kernel w may be a portion of weight kernels used in the first layer 111, and the result value R of the convolution operation corresponding to the weight kernel w may be a portion of the output feature map y. When a convolution operation between all the weight kernels used in the first layer 111 and the input feature map x is completed, the output feature map y of the first layer 111 may be determined. The processing apparatus 100 may determine the output feature map y by converting a result value of the convolution operation to a data format corresponding to the input feature map x through a postprocessing operation such as quantization. For example, the processing apparatus 100 may determine a quantization parameter corresponding to a target bit number using a pretrained neural network, and generate the output feature map y by multiplying the result value R by the quantization parameter.

The processing apparatus 100 may perform, on remaining convolutional layers of the neural network 110 including the second layer 112, operations corresponding to the foregoing operations performed on the first layer 111. An output feature map of the first layer 111 that is generated based on a result value of a convolution operation in the first layer 111 may correspond to an input feature map of the second layer 112.

Figure 2:
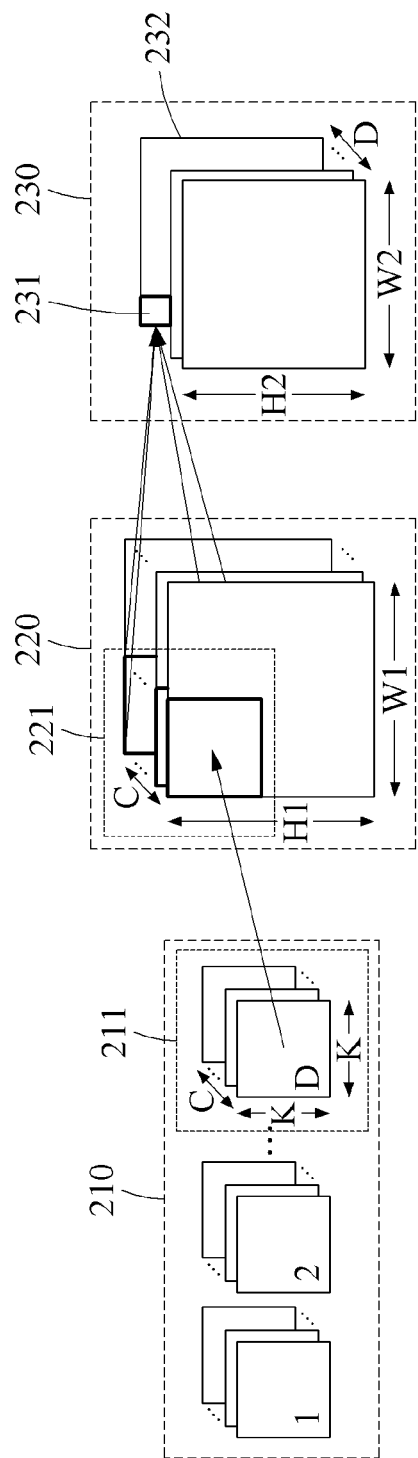
FIG. 2 illustrates an example of an architecture of a convolutional neural network (CNN).

FIG. 2 illustrates an example of an architecture of a CNN. A CNN of FIG. 2 may correspond to one of layers in the neural network 110 of FIG. 1.

Referring to FIG. 2, output feature maps 230 are generated based on a convolution operation between weight kernels 210 and input feature maps 220. In this example of FIG. 2, a weight kernel 211 may include C sub weight kernels each having a size of K*K. Thus, a size of the weight kernel 211 may be K*K*C, which may indicate the number of data elements included in the weight kernel 211. That is, the weight kernel 211 may include K*K*C elements. The weight kernel 211 may have a width and a vertical length that are different from each other. That is, the weight kernel 211 may have a size of K1*K2*C, in which K1 and K2 are different from each other. Hereinafter, it may be assumed that K1 and K2 are the same for convenience of description.

In addition, C may indicate the number of input channels. For example, C sub weight kernels of a first layer in the CNN may include red, green, and blue (RGB) components (e.g., an input channel for each of the RGB components). Weight kernels having a size of K*K*C may each form a single output channel. In the example of FIG. 2, the number of weight kernels having the size of K*K*C may be D, and thus the network layer may include D output channels. That is, D may correspond to the number of output channels.

An area 231 in an output feature map 232 may be determined based on a convolution operation between the weight kernel 211 and an area 221 in the input feature maps 220. The output feature map 232 may be generated through convolution operations between the weight kernel 211 and the input feature maps 220 performed sequentially for remaining areas in the output feature map 232. In this example, a size of an input feature map may be W1*H1, and a size of an output feature map may be W2*H2. The size of the output feature map may be smaller than the size of the input feature map. The input feature maps 220 may include C input feature maps, and the output feature maps 230 may include D output feature maps, e.g., dependent on the number of weight kernels.

The network layer of FIG. 2 may correspond to the first layer 111 of FIG. 1, and the weight kernel 211 may correspond to the weight kernel w of FIG. 1. In addition, the input feature maps 220 of FIG. 2 may correspond to the input feature map x of FIG. 1, and the output feature map 232 may correspond to the output feature map y of FIG. 1. In this example, the area 231 in the output feature map 232 may be determined based on a bitwise convolution operation between a bit serial corresponding to the weight kernel 211 and a bit serial corresponding to the area 221 in the input feature maps 220. In addition, remaining areas in the output feature map 232 may be determined based on bitwise convolution operations between the bit serial corresponding to the weight kernel 211 and remaining areas in the input feature maps 220. When a bitwise convolution operation is completed for an entirety of the weight kernels 210, an entirety of the output feature maps 230 may be determined.

Figure 3:
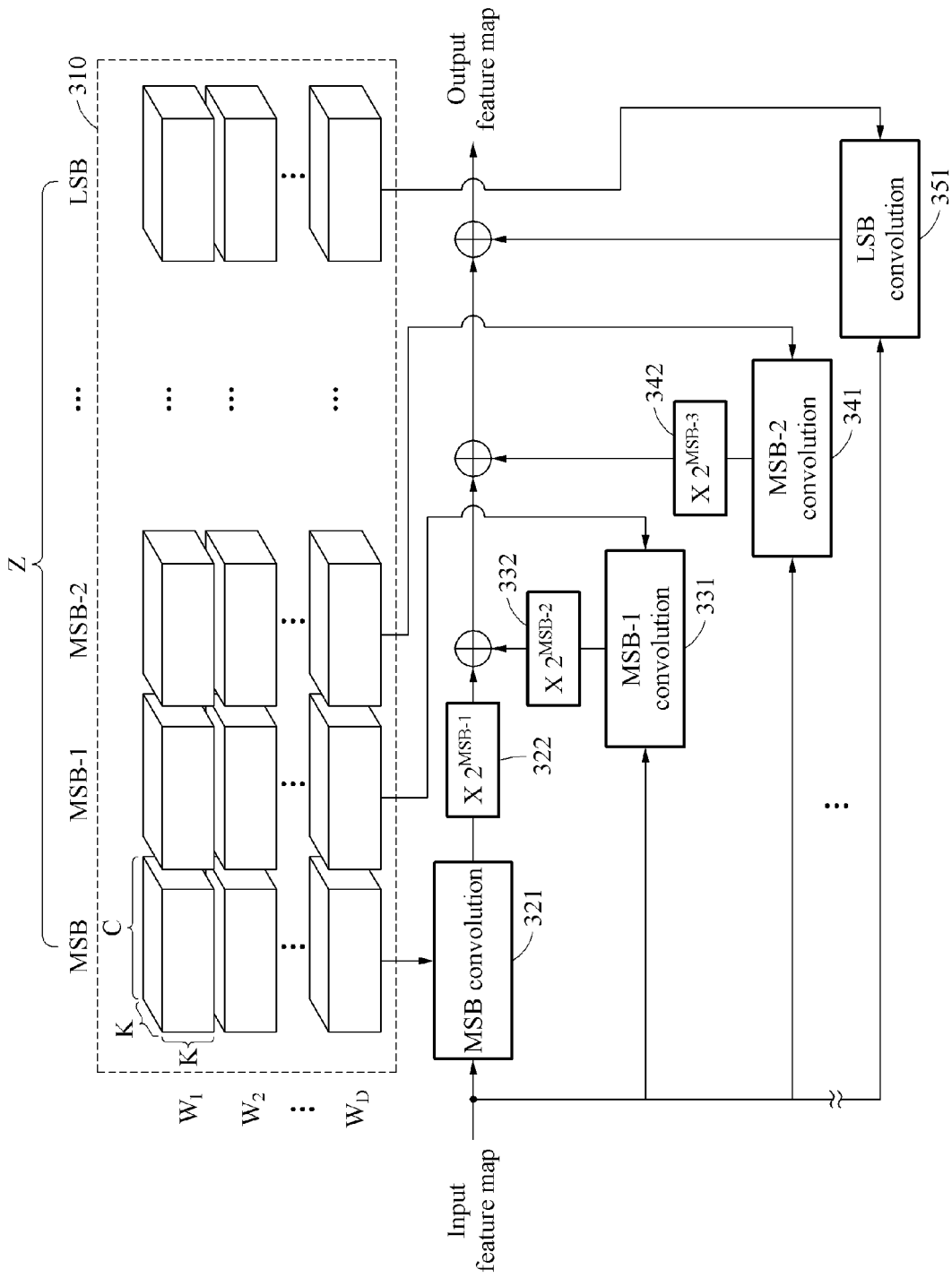
FIG. 3 illustrates an example of a bitwise operation-based convolution for a single layer.

FIG. 3 illustrates an example of a bitwise operation-based convolution for a single layer. A convolution to be described hereinafter with reference to FIG. 3 may be applied to any one of the layers in the neural network 110 of FIG. 1. A layer to which the convolution is to be applied may be referred to herein as a target layer.

In the example of FIG. 3, illustrated are bit-serial blocks 310 of weight kernels W1 through WD. A processing apparatus may generate the bit-serial blocks 310 by slicing data of each weight kernel based on each bit position. In this example, each of the bit-serial blocks 310 may have a K*K*C dimension. Since each bit-serial block may be obtained by slicing data of a weight kernel by each bit position, a dimension of each bit-serial block may correspond to a dimension of a corresponding weight kernel.

For example, as illustrated, the weight kernel W1 may have a K*K*C dimension. In this example, bit-serial blocks corresponding to the weight kernel W1 may be generated by slicing data of K*K*C elements included in the weight kernel W1 by each of bit positions of an MSB through an LSB. In this example, in a case in which elements included in the weight kernel W1 have a bitwidth of Z bits, the number of the bit-serial blocks corresponding to the weight kernel W1 may be Z. Elements of each bit-serial block may include single bits. That is, each bit-serial block may include K*K*C single bits. Hereinafter, a bit-serial block will be described in detail with reference to FIG. 4.

Figure 4:
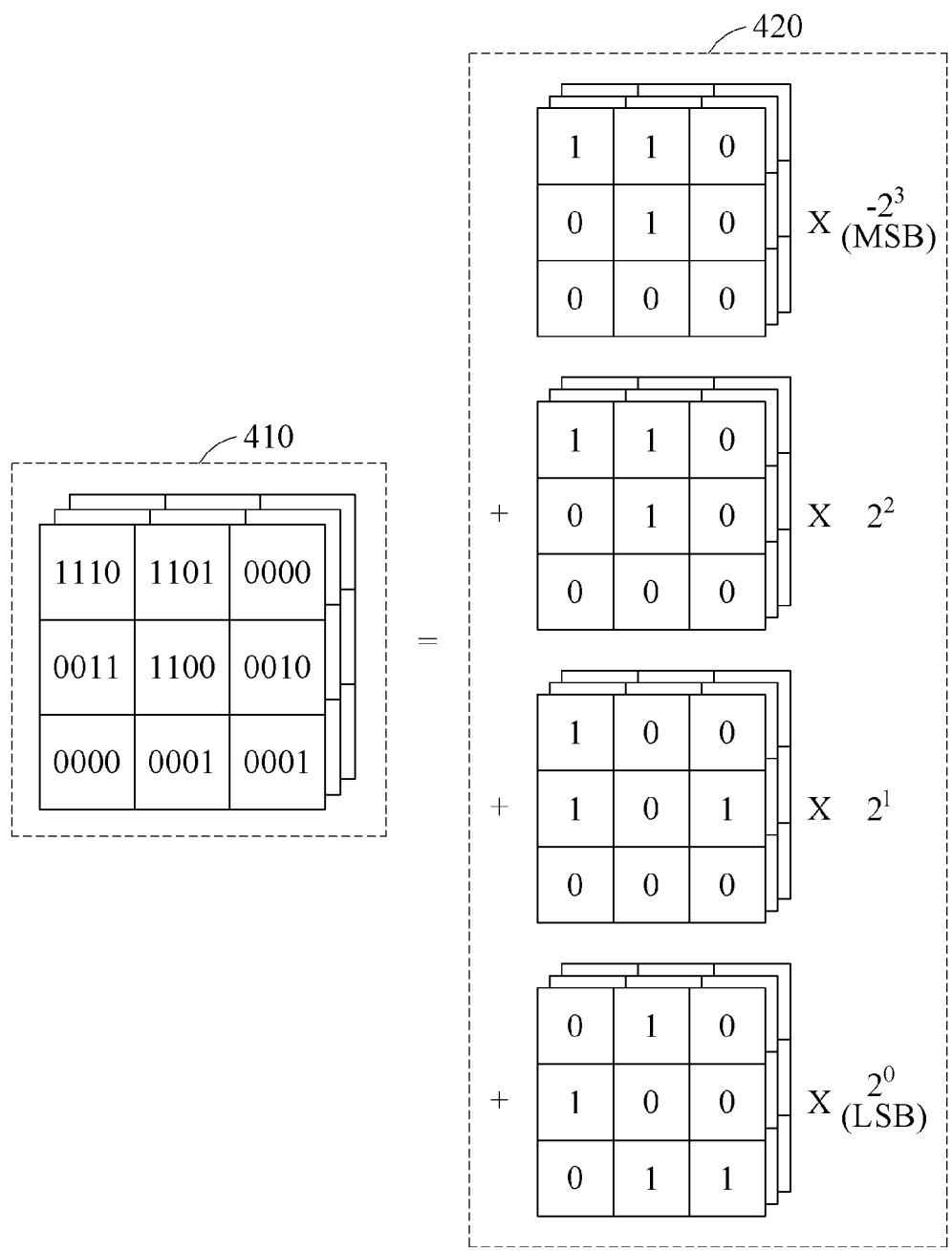
FIG. 4 illustrates an example of bit-serial blocks.

FIG. 4 illustrates an example of bit-serial blocks. Referring to FIG. 4, a weight kernel 410 may have a 3*3*3 dimension and may include elements having a bitwidth of 4 bits. The weight kernel 410 may be converted to four separate bit-serial blocks 420. An MSB bit-serial block may indicate a sign bit. The weight kernel 410 may be obtained by applying bit positions of bits including an MSB through an LSB to the bit-serial blocks 420 and adding them. That is, positions of single bit elements of a given bit-serial block 420 may correspond to positions of elements of the weight kernel 410 that include a given bit position. For example, as the (1,1), (1,2), and (2,2) positions of the weight kernel 410 include elements having an MSB, a bit-serial block 420 corresponding to the MSB (the uppermost bit-serial block 420 in FIG. 4) may thus have single bit elements at the (1,1), (1,2), and (2,2) positions. The weight kernel 410 may correspond to one of the weight kernels $W_1$ through $W_D$ of FIG. 3, and the bit-serial blocks 420 may correspond to bit-serial blocks 310 corresponding to one of the weight kernels $W_1$ through $W_D$ of FIG. 3.

Referring back to FIG. 3, the processing apparatus may perform a convolution operation between a weight kernel and an input feature map using the bit-serial blocks 310, and may determine an output feature map based on a result value of the convolution operation. For example, as illustrated, when an area in the input feature map corresponding to the weight kernel $W_D$ is referred to as a first area, the processing apparatus may perform a convolution operation on the first area using bit-serial blocks corresponding to the weight kernel $W_D$ and bit-serial blocks corresponding to the first area.

In this example, the processing apparatus may perform an MSB convolution between a bit-serial block corresponding to an MSB of the weight kernel WD and the bit-serial blocks corresponding to the first area in block 321, and may apply a bit position $2^{MSB-1}$ to a result value of the MSB convolution in block 322 (e.g., multiplying the result value of the MSB convolution by the bit position $2^{MSB-1}$). In blocks 331 and 332, and blocks 341 and 342, the processing apparatus may also perform operations corresponding to those performed in blocks 321 and 322. In this example, block 351 is related to an LSB, and thus multiplying a bit position $2^0$ may be omitted. The processing apparatus adds result values of operations in blocks 322, 332, 342, and 351, and may determine an element value of an output feature map corresponding to the first area. The processing apparatus may determine an output feature map corresponding to the weight kernel $W_D$ by performing convolution operations between the weight kernel $W_D$ and remaining areas, and may determine output feature maps for a target layer by performing convolution operations on remaining weight kernels.

Figure 5:
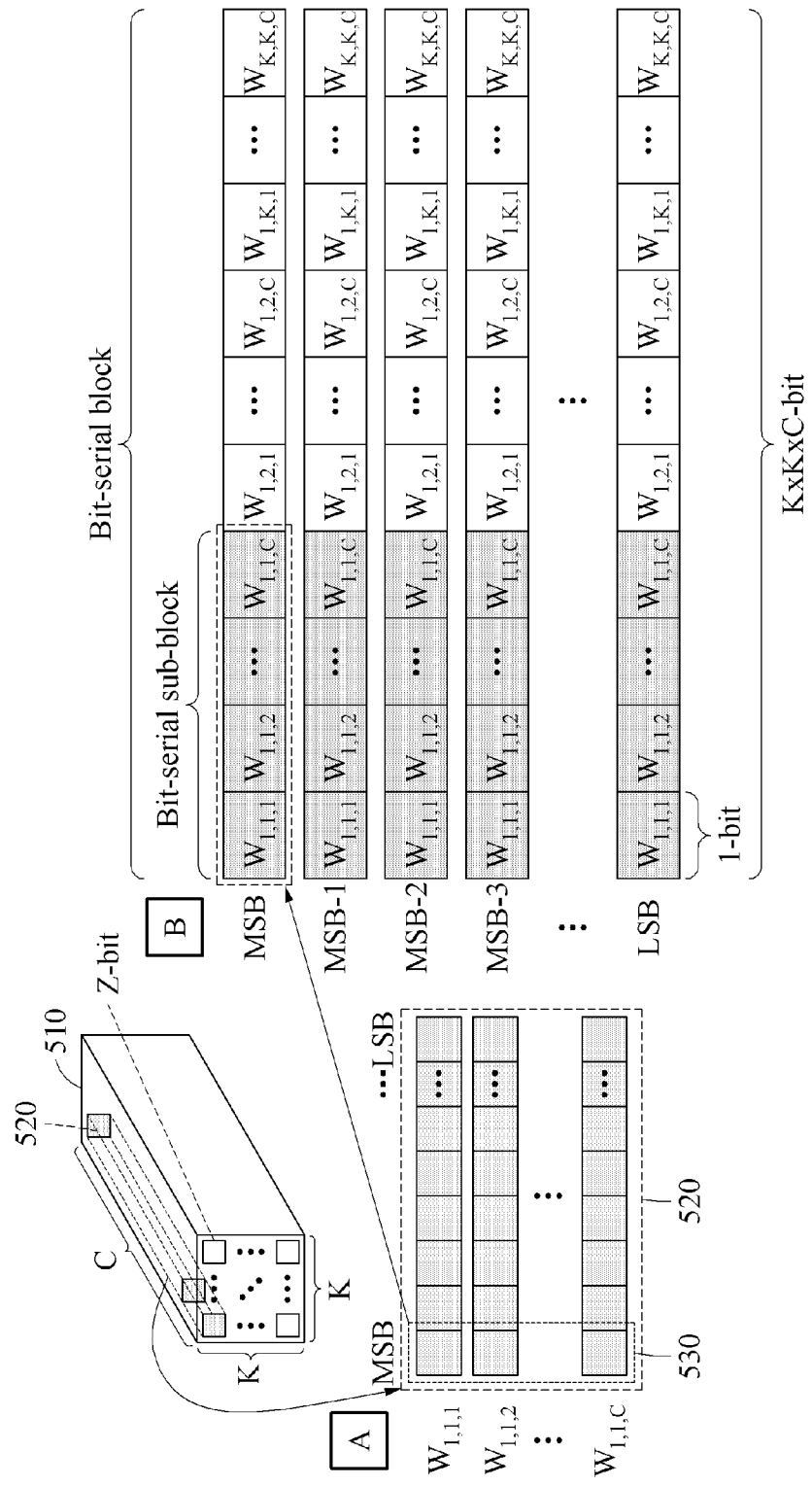
FIG. 5 illustrates an example of bit-serial blocks corresponding to a single weight kernel.

FIG. 5 illustrates an example of bit-serial blocks corresponding to a single weight kernel. A weight kernel 510 of FIG. 5 may correspond to one of the weight kernels $W_1$ through $W_D$ of FIG. 3. A processing apparatus may convert weight kernels to bit serials, and a bit-serial block may be a unit used to classify the bit serials based on a data characteristic. A bit-serial block may be divided into bit-serial sub-blocks.

Referring to FIG. 5, the weight kernel 510 may include K*K*C elements each represented by $W_{(x, y, z)}$. For example, as illustrated, an element group 520 may be represented by $W_{(1, 1, z)}$. In the example of FIG. 5, A may indicate bits included in each element in the element group 520, and B may indicate bit-serial blocks corresponding to the weight kernel 510. Each unit block in A and B may include 1-bit data, and a representation of $W_{(x, y, z)}$ in each unit block may indicate a corresponding element of each bit. For example, as illustrated, a unit block including a representation of $W_{(1, 1, 1)}$ among unit blocks of a bit-serial block corresponding to an MSB may include an MSB of an element corresponding to $W_{(1, 1, 1)}$. When bit-serial blocks are considered a memory map, $W_{(1, 1, 1)}$ of an MSB may correspond to a lowest address of a memory, and W(K, K, C) of an LSB may correspond to a highest address of the memory.

The bit-serial blocks may be extracted from the weight kernel 510 through various methods. For example, bit-serial blocks of an input feature map may be extracted through the same method as one through which the bit-serial blocks are extracted from the weight kernel 510.

Figure 6A:
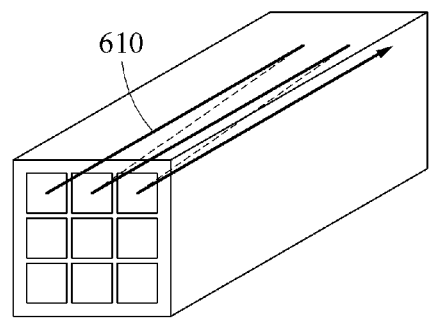
FIGS. 6A through 6C illustrate examples of bit extraction.
Figure 6B:
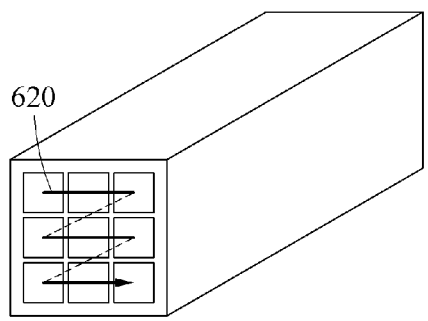
Figure 6C:
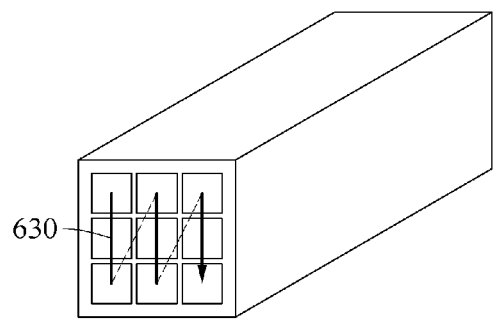

FIGS. 6A through 6C illustrate examples of bit extraction. Bit extraction methods may include an interleaving method to extract bit-serial blocks along a channel direction of input feature maps and weight kernels, and a planar method to extract bit-serial blocks along a planar direction of input feature maps and weight kernels. Referring to FIG. 6A, an arrow-indicating direction 610 is a channel direction. The channel direction may be from $W_{(1, 1, 1)}$ towards $W_{(1, 1, 2)}$. Referring to FIGS. 6B and 6C, arrow-indicating directions 620 and 630 are a planar direction. The planar direction may be from $W_{(1, 1, 1)}$ towards $W_{(1, 2, 1)}$, or from $W_{(1, 1, 1)}$ towards $W_{(2, 1, 1)}$. Bits in a bit-serial block may be extracted through various other methods in addition to the bit extraction methods described above.

Referring back to FIG. 5, a bit-serial sub-block may indicate a data processing unit. The number of bits included in the bit-serial sub-block may correspond to a reference bitwidth of an SIMD system. In a case of the SIMD system, a size of data to be processed at once may be determined based on a preset reference bitwidth. The reference bitwidth may be one of 32 bits, 62 bits, and 128 bits.

For example, in a case in which the reference bitwidth is the same as C as illustrated, bits having a corresponding dimension and a corresponding bit position may be processed at once based on a single instruction. In the example of FIG. 5, bits 530 indicate MSBs of elements in the element group 520. In this example, when the reference bitwidth is the same as C, operations for the bits 530 may be processed at one time based on a single instruction.

In a case in which a space that does not satisfy the reference bitwidth is present in the bit-serial block, the space may be filled with 0 for SIMD processing. In an example, zero padding may be performed for each bit-serial sub-block. In this example, when the reference bitwidth is 128 bits and C is 100, the last 28 bit spaces in a bit-serial sub-block may be filled with 0.

In another example, zero padding may be performed for each bit-serial block. In this example, a bit-serial block may indicate a unit that classifies a bit serial based on a bit position. For example, the weight kernel 510 may be converted to Z bit-serial blocks including a bit-serial block corresponding to an MSB through a bit-serial block corresponding to an LSB, and each of the Z bit-serial blocks may have a size of K*K*C bits. In this example, when the reference bitwidth is 128 bits, K is 4, and C is 100, last 64 bit spaces of a bit-serial block may be filled with 0 because 128*13=1664.

Figure 7A:
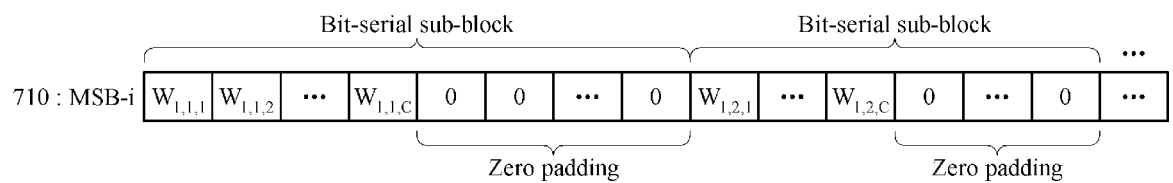
FIGS. 7A and 7B illustrate examples of zero padding.
Figure 7B:
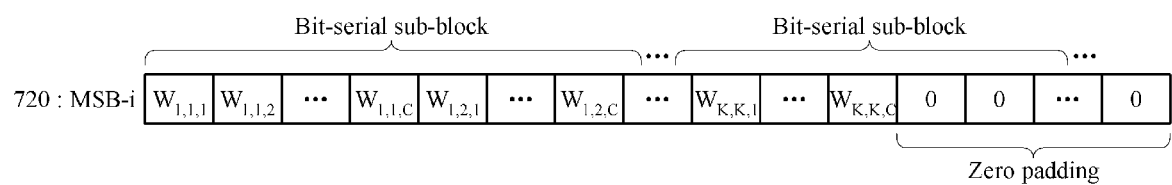

FIGS. 7A and 7B illustrate examples of zero padding. Referring to FIG. 7A, zero padding may be performed on each bit-serial sub-block for a bit serial 710. Referring to FIG. 7B, zero padding may be performed on each bit-serial block for a bit serial 720.

Figure 8:
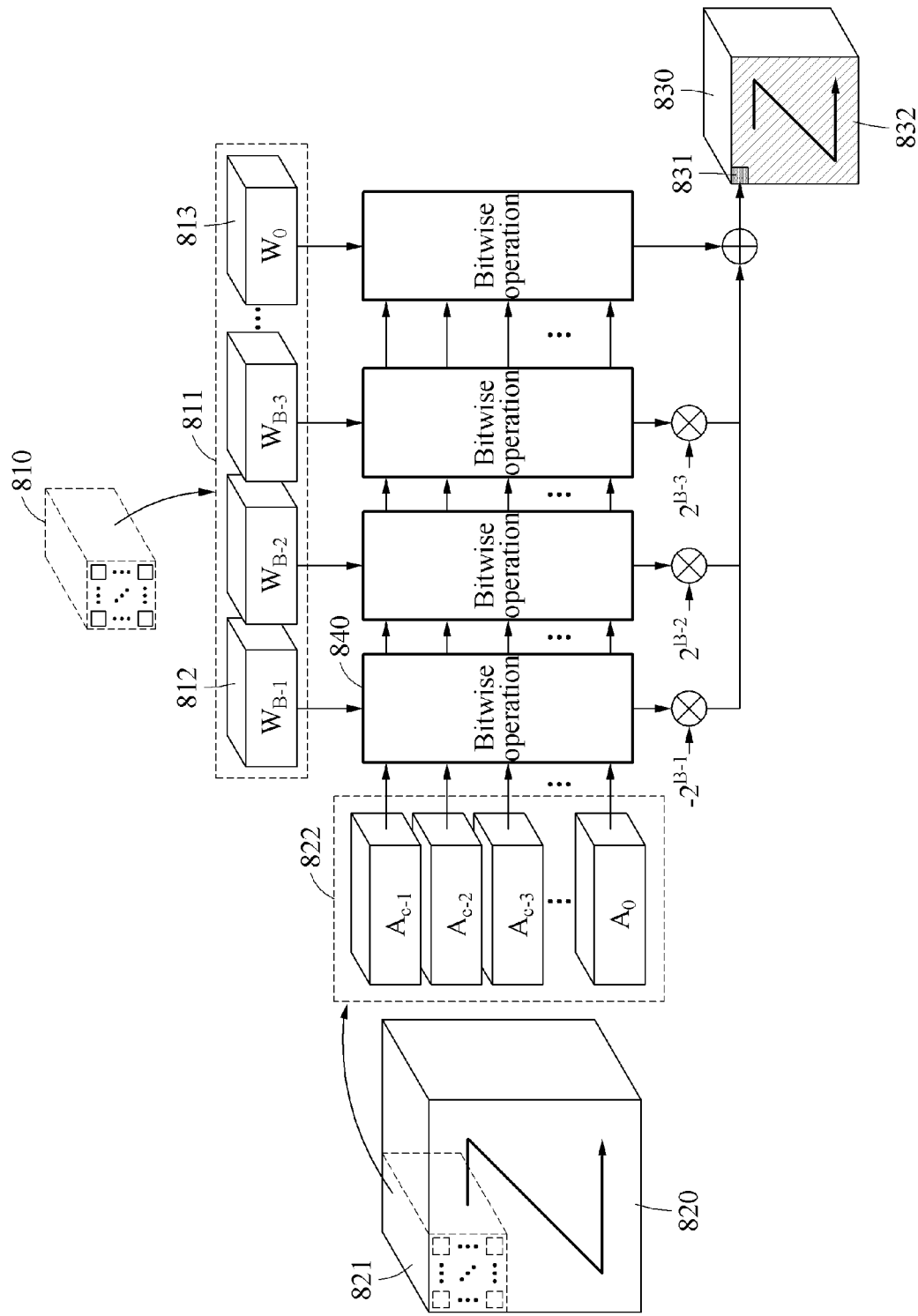
FIG. 8 illustrates an example of a bitwise operation-based convolution for a single weight kernel.

FIG. 8 illustrates an example of a bitwise operation-based convolution for a single weight kernel.

Referring to FIG. 8, a processing apparatus may determine an output feature map 832 by performing a bitwise operation-based convolution operation between a weight kernel 810 and input feature maps 820. The bitwise operation-based convolution operation may include a bitwise operation between bit serials, and bit positioning. The input feature maps 820 and output feature maps 830 are displayed in three dimensions, which indicates that multiple input feature maps and multiple output feature maps may overlap, respectively.

The processing apparatus may obtain bit-serial blocks 811 corresponding to the weight kernel 810, and may convert data corresponding to an area 821 in the input feature maps 820 to bit-serial blocks 822. The area 821 may correspond to the weight kernel 810, and the bit-serial blocks 811 and the bit-serial blocks 822 may have a same dimension. In a similar way of converting data, for example, weights, of the weight kernel 810 to the bit-serial blocks 811, the processing apparatus may convert data, for example, activations, corresponding to the area 821 in the input feature maps 820 to the bit-serial blocks 822. The bit-serial blocks 811 and the bit-serial blocks 822 may include bits having same bit positions. A bitwidth B for representing a weight and a bitwidth C for representing an activation may be identical to or different from each other. The weight kernel 810 may correspond to one of the weight kernels $W_1$ through $W_D$ of FIG. 3.

For example, in a case in which the weight kernel 810 has a bitwidth of B bits, the number of B bits representing a weight of the weight kernel 810 may be represented by Equation 4, for example.

$$W:(w_{B-1}w_{B-2}w_{B-3} \ldots w_1w_0) \quad \text{Equation 4:}$$

In Equation 4, W may indicate a weight, and $W_{B-1}$ through $W_0$ indicate bits included in W. By applying a bit position to each bit in Equation 4, Equation 4 may be represented by Equation 5, for example.

$$W = w_{B-1} \times (-2^{B-1}) + \sum_{k=0}^{B-2} w_k \times (+2^k) \quad \text{Equation 5}$$

In Equation 5, W may be assumed as a signed value. A first bit in W may be a sign bit, and W may be represented by a two's complement. In Equation 5, coefficients used to apply the bit position, for example, $-2^{B-1}$ and $+2^k$, are referred to as correction coefficients. The bit-serial blocks 811 may include bits corresponding to their bit positions based on Equations 4 and 5. For example, a bit-serial block 812 may include bits corresponding to a bit position of $-2^{B-1}$. The bit-serial block 812 may correspond to an MSB bit-serial block of FIG. 5, and a bit-serial block 813 may correspond to an LSB bit-serial block of FIG. 5.

Similarly, in a case in which the input feature maps 820 have a bitwidth of C bits, the number of C bits representing the activation data of the input feature maps 820 may be represented by Equation 6, for example.

$$A = \sum_{k=0}^{C-1} A_k \times 2^k \quad \text{Equation 6}$$

In Equation 6, A may indicate activation data, and $A_k$ may indicate each bit included in A. The activation data passing through a rectified linear unit (ReLU) may be a positive value, and it is thus assumed that A does not include a sign bit for convenience. However, in a case in which a different type of activation function is applied, A may include a sign bit as in W.

The processing apparatus may perform a bitwise operation based on Equation 7 in each bitwise operation block of FIG. 8. A bitwise operation performed in each bitwise operation block may include a logical AND operation and a popcount operation.

$$\sum_{i=0}^{C-1} 2^i popcnt[\text{and } (A_i, W_j)] \quad \text{Equation 7}$$

In Equation 7, "popcnt" may indicate the popcount operation, and "and" may indicate the logical AND operation. $A_i$ may indicate the bit-serial blocks 822 and $W_j$ may indicate the bit-serial blocks 811, in which j indicates a bit position of the bit-serial blocks 811 and has a value of 0 through B−1. For example, in bitwise operation block 840, a bitwise operation based on Equation 8 may be performed.

$$\sum_{i=0}^{C-1} 2^i popcnt[\text{and } (A_i, W_{B-1})] \quad \text{Equation 8}$$

For example, the processing apparatus may perform the logical AND operation between a first bit-serial block which is one of the bit-serial blocks 811 and a second bit-serial block which is one of the bit-serial blocks 822, may perform the popcount operation on a result value of the logical AND operation, and may determine a result value of a convolution operation based on a result value of the popcount operation. The processing apparatus may perform bit positioning based on the result value of the popcount operation.

Bits in the first bit-serial block which is one of the bit-serial blocks 811 may correspond to one of bits of an MSB through an LSB. When the result value of the convolution operation is determined, bit-serial blocks corresponding to bit positions different from those of the first bit-serial block may be computed or operated independently from the first bit-serial block. For example, a bitwise operation and bit positioning for the bit-serial block 812 may be performed independently from a bitwise operation and bit positioning for the bit-serial block 813.

When a bitwise operation is completed in each bitwise operation block, the processing apparatus may apply a bit position to a result value of the bitwise operation. For example, a bitwise operation performed in the bitwise operation block 840 may be based on the bit-serial block 812, and thus a result value of the bitwise operation block 840 may be multiplied by a correction coefficient of $-2^{B-1}$ corresponding to the bit-serial block 812.

As described above, the processing apparatus may perform a bitwise operation between the bit-serial blocks 811 and the bit-serial blocks 822, apply a correction coefficient to a result value of the bitwise operation, and determine an element value 831 of the output feature map 832. In this example of FIG. 8, the element value 831 may correspond to a result value of a convolution operation between the weight kernel 810 and the area 821. The processing apparatus may determine the output feature map 832 by performing a convolution operation on remaining areas in the input feature maps 820, and may determine the output feature maps 830 based on a convolution operation between remaining weight kernels and the input feature maps 820.

Figure 9:
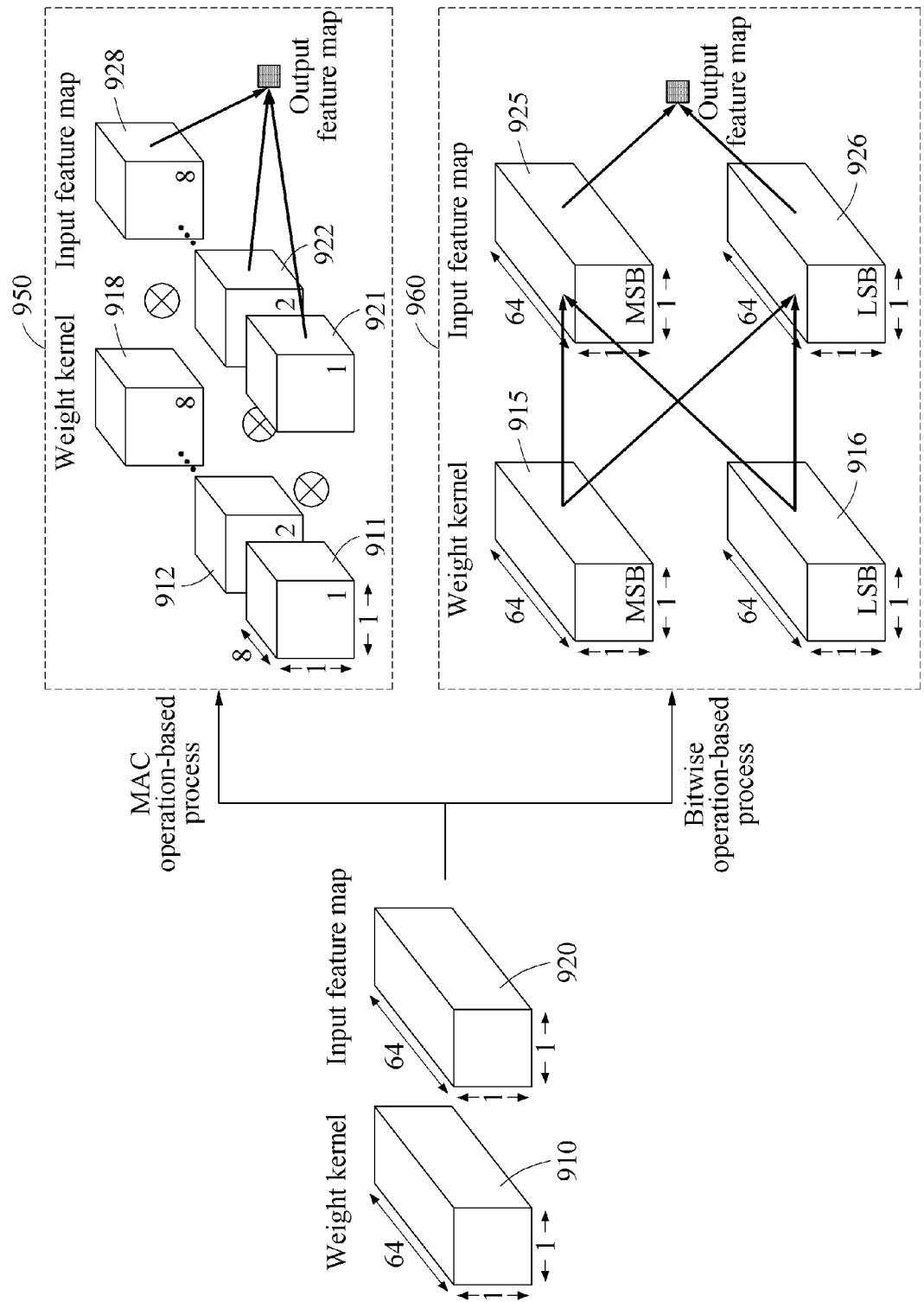
FIG. 9 illustrates an example of a comparison between bitwise operation-based processing and multiply-accumulate (MAC) operation-based processing.

FIG. 9 illustrates an example of a comparison between bitwise operation-based processing of an example of the present disclosure and a typical MAC operation-based processing. Referring to FIG. 9, each of a weight kernel 910 and an input feature map 920 may include 1*1*64 elements. The elements of the weight kernel 910 and the input feature map 920 may have a bitwidth of 2 bits.

In block 950, a typical convolution operation between the weight kernel 910 and the input feature map 920 may be processed based on a MAC operation. For example, in a case in which 64-bit SIMD is used, only 8 elements may be processed at once even when a bitwidth of an element is 2 bits. Since it may be determined that a minimum data unit that is to be processed is a character having an 8-bit size, a 2-bit element may occupy an 8-bit container, and thus 64 bits may be used to process the 8 elements. Thus, in the typical convolution operation, 8 loading operations may be needed to load the weight kernel 910 from a memory, and 8 loading operations may be needed to load the input feature map 920 from the memory may be needed. Thus, a total of 16 loading operations may be needed. In addition, 8 operations may be needed for the typical convolution operation for pairs of data. The 8 operations may include a convolution operation between a first pair of data 911 and 921, a convolution operation between a second pair of data 912 and 922, and a convolution operation between a last pair of data 918 and 928.

However, in block 960, a convolution operation of the present disclosure between the weight kernel 910 and the input feature map 920 is processed based on a bitwise operation. A dimension of each bit-serial block may be 1*1*64 and each element may include 1 bit, and thus a size of each bit-serial block may be 64 bits. Thus, in a case in which 64-bit SIMD is used, one bit-serial block may be loaded at one time. Thus, 2 loading operations may be sufficient to load the weight kernel 910 from the memory, and 2 loading operations may be sufficient to load the input feature map 920 from the memory. Thus, a total of 4 loading operations may be sufficient. In addition, 4 operations may be sufficient for the convolution operation for pairs of data. The 4 operations may include a convolution operation between a MSB bit-serial block 915 and a MSB bit-serial block 925, a convolution operation between the MSB bit-serial block 915 and a LSB bit-serial block 926, a convolution operation between a LSB bit-serial block 916 and the MSB bit-serial block 925, and a convolution operation between the LSB bit-serial block 916 and the LSB bit-serial block 926.

Thus, compared to the typical MAC operation-based processing, the bitwise operation-based processing of the present disclosure may reduce the number of data loading operations by a factor of 4 times, and the number of operations to be performed by a factor of 2 times. Thus, compared to the typical convolution operation including the MAC operation, the bitwise operation-based convolution operation of the example of the present disclosure may be more effective in terms of utilization of a memory space and computing energy. Such efficient use of memory space and computing energy may be especially advantageous in a limited resource environment such as a mobile terminal.

Figure 10:
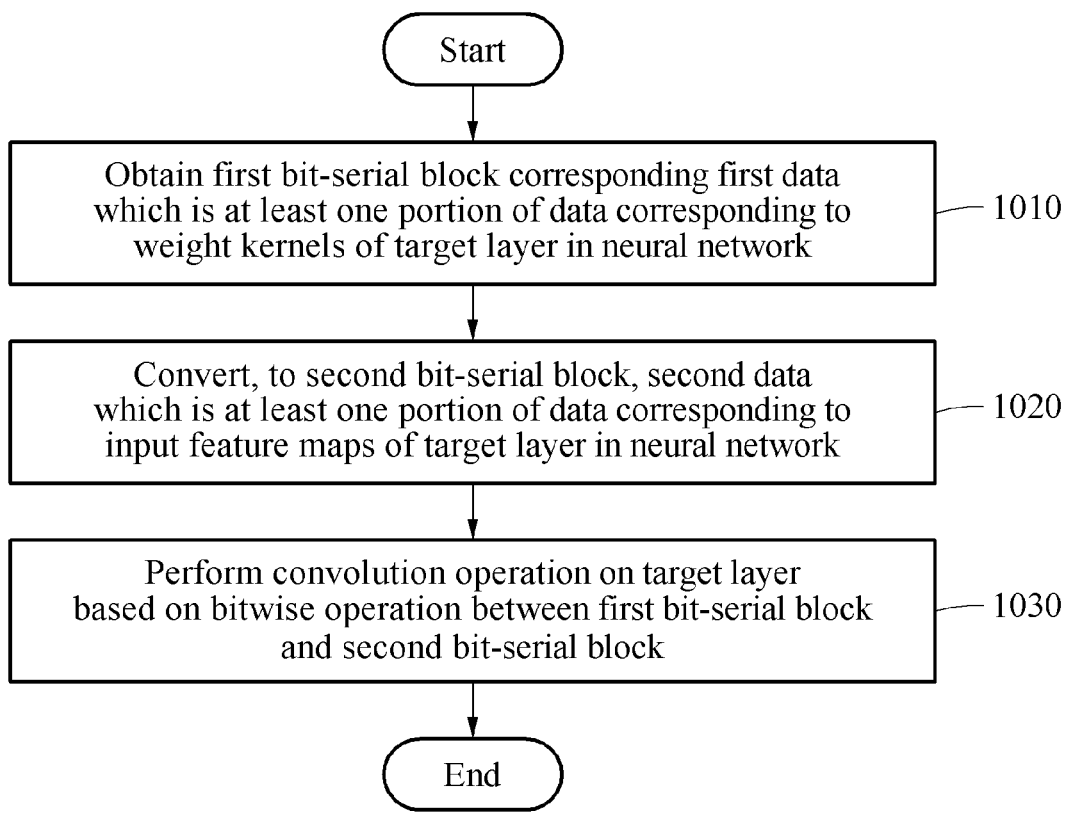
FIG. 10 is a flowchart illustrating an example of a processing method using a neural network.

FIG. 10 is a flowchart illustrating an example of a processing method using a neural network. Hereinafter, the processing method using a neural network may also be referred to as a neural network processing method and shortly as a processing method.

Referring to FIG. 10, in operation 1010, a processing apparatus may obtain a first bit-serial block corresponding to first data which is at least one portion of data corresponding to weight kernels of a target layer in a neural network. The data corresponding to the weight kernels may correspond to elements or weights of the weight kernels. Operation 1010 may include obtaining the first bit-serial block which is stored in a memory in advance from the memory, or converting the first data to the first bit-serial block. The obtaining of the first bit-serial block prestored in the memory from the memory may be performed when a pretrained weight kernel is converted to the first bit-serial block and the first bit-serial block is stored in the memory.

In operation 1020, the processing apparatus may convert, to a second bit-serial block, second data which is at least one portion of data corresponding to input feature maps of the target layer in the neural network. The data corresponding to the input feature maps may correspond to elements or activation data of the input feature maps.

In operation 1030, the processing apparatus may perform a convolution operation on the target layer in the neural network based on a bitwise operation between the first bit-serial block and the second bit-serial block. For example, the target layer may correspond to one of layers in the neural network 110 illustrated in FIG. 1. The processing apparatus may perform operations 1010 through 1030 by changing a target layer such that operations 1010 through 1030 are performed repeatedly on all convolutional layers in the neural network. For a more detailed description of the processing method of the flowchart of FIG. 10, reference may be made to the descriptions provided above with reference to FIGS. 1 through 9.

Figure 11:
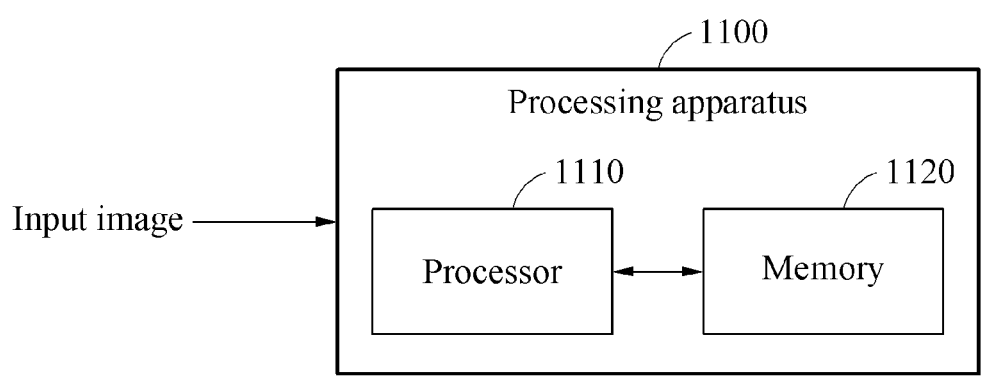
FIG. 11 illustrates an example of a processing apparatus using a neural network.

FIG. 11 illustrates an example of a processing apparatus.

Referring to FIG. 11, a processing apparatus 1100 may receive input data, and process an operation of a neural network associated with the input image. The operation of the neural network may include, for example, recognizing or verifying an object in the input image. The processing apparatus 1100 may perform at least one of the operations described herein in relation to processing the neural network, and provide a user with a result of processing the neural network. The processing apparatus 1100 may perform the bitwise operation-based convolution described herein while processing the operation of the neural network.

The processing apparatus 1100 may include at least one processor 1110 and a memory 1120. The memory 1120 may be connected to the processor 1110 and store instructions executable by the processor 1110, and data processed by the processor 1110 or data to be processed by the processor 1110. For example, in a case in which a weight kernel is trained in advance, the trained weight kernel may be converted to a bit serial in advance, and the bit serial may be stored in the memory 1120. The processing apparatus 1100 may obtain the bit serial from the memory 1120. The memory 1120 may include a non-transitory computer-readable medium, for example, a high-speed random-access memory (RAM), and/or a nonvolatile computer-readable storage medium, for example, at least one disk storage device, a flash memory device, and other nonvolatile solid-state memory devices.

The processor 1110 may execute instructions to perform at least one of the operations described above with reference to FIGS. 1 through 10. For example, when the instructions stored in the memory 1120 are executed by the processor 1110, the processor 1110 may obtain a first bit-serial block corresponding to first data which is at least one portion of data corresponding to weight kernels of a target layer in a neural network, convert, to a second bit-serial block, second data which is at least one portion of data corresponding to input feature maps of the target layer in the neural network, and perform a convolution operation on the target layer based on a bitwise operation between the first bit-serial block and the second bit-serial block.

Figure 12:
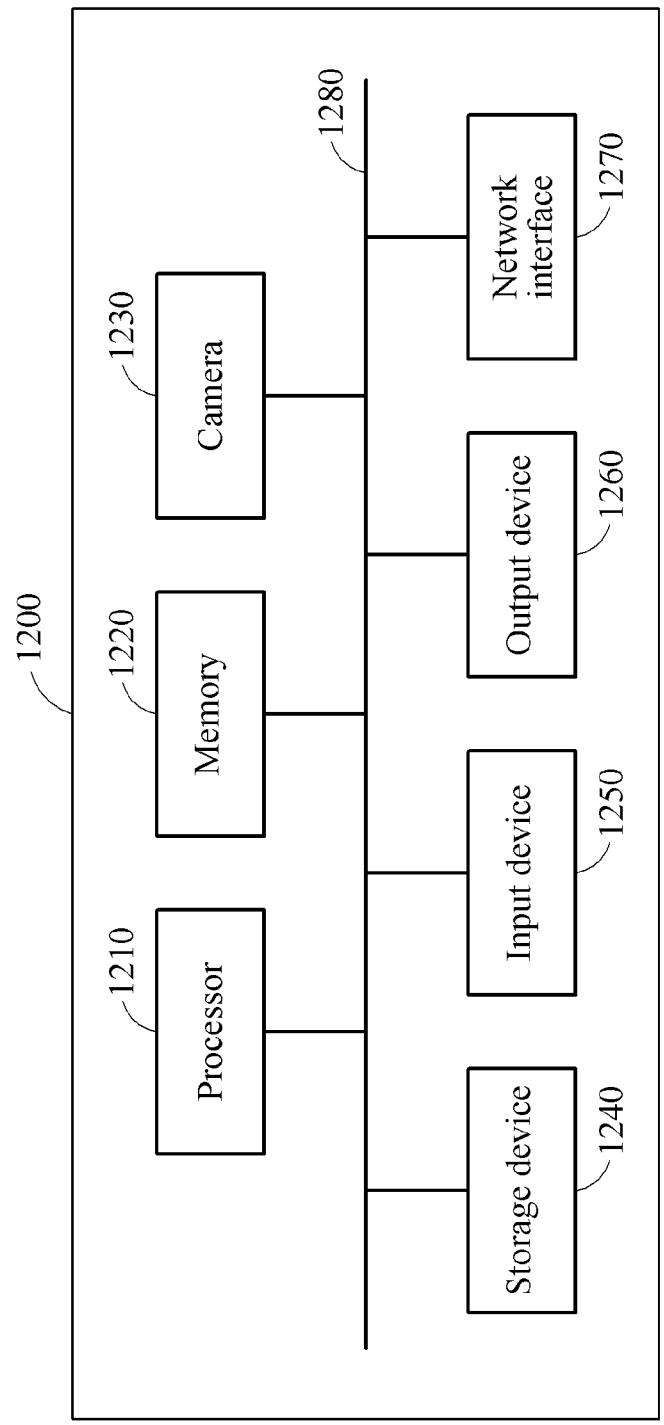
FIG. 12 illustrates an example of an electronic apparatus.

FIG. 12 illustrates an example of an electronic apparatus.

Referring to FIG. 12, an electronic apparatus 1200 may receive an input image and process an operation of a neural network associated with the input image. The operation of the neural network may include, for example, recognizing or verifying an object in the input image. The electronic apparatus 1200 may perform the bitwise operation-based convolution described above in relation to processing the operation of the neural network. The electronic apparatus 1200 may include the processing apparatus described above with reference to FIGS. 1 through 10, or functions of the processing apparatus described above with reference to FIGS. 1 through 10.

The electronic apparatus 1200 may include a processor 1210, a memory 1220, a camera 1230, a storage device 1240, an input device 1250, an output device 1260, and a network interface 1270. The processor 1210, the memory 1220, the camera 1230, the storage device 1240, the input device 1250, the output device 1260, and the network interface 1270 may communicate with one another through a communication bus 1280.

The processor 1210 may execute a function and an instruction in the electronic apparatus 1200. For example, the processor 1210 may process instructions stored in the memory 1220 or the storage device 1240. The processor 1210 may perform at least one of the operations described above with reference to FIGS. 1 through 11.

The memory 1220 may store information to be used to process the operation of the neural network. The memory 1220 may include a computer-readable storage medium or a computer-readable storage device. The memory 1220 may store instructions to be executed by the processor 1210, and store related information while instructions or an application is being executed by the electronic apparatus 1200.

The camera 1230 may capture a still image, a video image, or both the images. The camera 1230 may capture an image of a face region input by a user for face verification. The camera 1230 may also provide a three-dimensional (3D) image including depth information of objects.

The storage device 1240 may include a computer-readable storage medium or a computer-readable storage device. The storage device 1240 may store a database (DB) including information to be used to process the neural network, such as, for example, a weight kernel and a bit-serial of the weight kernel. The storage device 1240 may store a greater amount of information for a longer period of time, compared to the memory 1220. The storage device 1240 may include, for example, a magnetic hard disk, an optical disc, a flash memory, a floppy disk, and other types of nonvolatile memory that are well-known in the related technical field.

The input device 1250 may receive an input from a user through a traditional input method, for example, a keyboard and a mouse, and a new input method, for example, a touch input, a voice input, and an image input. The input device 1250 may include, for example, a keyboard, a mouse, a touchscreen, a microphone, and other devices that may detect the input from the user and transmit the detected input to the electronic apparatus 1200.

The output device 1260 may provide an output of the electronic apparatus 1200 to a user through a visual, auditory, or tactile channel. The output device 1260 may include, for example, a display, a touchscreen, a speaker, a vibration generator, and other devices that may provide the output to the user. The network interface 1270 may communicate with an external device through a wired or wireless network.

The neural network processing apparatuses, electronic apparatuses, processing apparatus 100, processing apparatus 1100, at least one processor 1110, memory 1120, electronic apparatus 1200, processor 1210, memory 1220, camera 1230, storage device 1240, input device 1250, output device 1260, network interface 1270, bus 1280, and other apparatuses, units, modules, devices, and other components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network processing method, comprising:
   obtaining a plurality of kernel bit-serial blocks each corresponding to bits of first data of a weight kernel of a layer in a neural network of a respective predetermined bit position;
   generating a feature map bit-serial block based on second data of one or more input feature maps of the layer; and
   generating at least a portion of an output feature map by performing a convolution operation of the layer using bitwise operations between the kernel bit-serial blocks and the feature map bit-serial block.

2. The method of claim 1, wherein the kernel bit-serial block and the feature map bit-serial block respectively include bits having same bit positions.

3. The method of claim 1, wherein
   the kernel bit-serial block includes bits corresponding to one of a plurality of bit positions of elements of kernel maps of the weight kernel, and
   the obtaining further comprises obtaining other kernel bit-serial blocks, calculated independently from the kernel bit-serial block, that each include bits corresponding to a bit position of the plurality of bit positions different than the one of the plurality of bit positions.

4. The method of claim 1, wherein the plurality of bit positions include a most significant bit (MSB) through a least significant bit (LSB).

5. The method of claim 1, wherein
   the kernel bit-serial block and the feature map bit-serial block are respectively extracted from the first data in a channel direction of the weight kernel and extracted from the second data in a channel direction of the one or more input feature maps, through an interleaving method, or
   the kernel bit-serial block and the feature map bit-serial block are respectively extracted from the first data in a planar direction of the weight kernel and extracted from the second data in a planar direction of two or more of the one or more input feature maps, through a planar method.

6. The method of claim 1, wherein the kernel bit-serial block and the feature map bit-serial block are based on a reference bitwidth for single instruction multiple data (SIMD) processing.

7. The method of claim 6, wherein a space that does not satisfy the reference bitwidth in the kernel bit-serial block and the feature map bit-serial block is filled with 0.

8. The method of claim 6, wherein the reference bitwidth is any one of 32 bits, 64 bits, and 128 bits.

9. The method of claim 1, wherein the bitwise operation includes a logical AND operation and a popcount operation.

10. The method of claim 1, wherein the kernel bit-serial block and the feature map bit-serial block have a same dimension.

11. The method of claim 1, wherein the performing of the convolution operation comprises:
    performing a logical AND operation between the kernel bit-serial block and the feature map bit-serial block;
    performing a popcount operation on a result value of the logical AND operation; and
    determining a result value of the convolution operation based on a result value of the popcount operation.

12. The method of claim 11, wherein the determining of the result value of the convolution operation comprises:
    performing bit positioning based on the result value of the popcount operation.

13. The method of claim 11, wherein the bit positioning is performed based on a bit position of the first data.

14. The method of claim 1, wherein each of the first data and the second data is represented by a bitwidth of less than 8 bits.

15. The method of claim 1, wherein the obtaining of the kernel bit-serial block comprises:
    obtaining the kernel bit-serial block prestored in a memory from the memory; or
    generating the kernel bit-serial block based on the first data.

16. A non-transitory computer-readable storage medium storing instructions that, when executed by one or more processors, cause the one or more processors to perform the method of claim 1.

17. A neural network processing apparatus, comprising:
    one or more processors configured to:
        obtain a plurality of kernel bit-serial blocks each corresponding to bits of first data of a weight kernel of a layer in a neural network of a respective predetermined bit position;
        generate a feature map bit-serial block based on second data of one or more input feature maps of the layer; and
        generate at least a portion of an output feature map by performing a convolution operation of the layer using a-bitwise operations between the kernel bit-serial blocks and the feature map bit-serial block.

18. The apparatus of claim 17, wherein the kernel bit-serial block and the feature map bit-serial block respectively include bits having same bit positions.

19. The apparatus of claim 17, wherein the kernel bit-serial block and the feature map bit-serial block are based on a reference bitwidth for single instruction multiple data (SIMD) processing.

20. The apparatus of claim 17, wherein the bitwise operation includes a logical AND operation and a popcount operation.

21. The apparatus of claim 17, wherein, for the performing of the convolution operation, the one or more processors are configured to perform a logical AND operation between the kernel bit-serial block and the feature map bit-serial block, perform a popcount operation on a result value of the logical AND operation, and determine a result value of the convolution operation based on a result value of the popcount operation.

22. The apparatus of claim 17, further comprising a memory storing instructions that, when executed by the one or more processors, configure the one or more processors to perform the obtaining of the kernel bit-serial block, the generating of the feature map bit-serial block, and the generating of at least the portion of the output feature map.

23. A processor-implemented neural network processing method, comprising:
    receiving a kernel of a neural network layer and a feature map to be processed by the neural network layer;
    obtaining a kernel bit-serial block including binary element values corresponding to elements of the kernel that include a bit of a predetermined bit position from among bit positions of the elements of the kernel;
    obtaining a feature map bit-serial block including binary element values corresponding to elements of the feature map that include a bit of a predetermined bit position from among bit positions of the elements of the feature map; and
    generating at least a portion of an output feature map by performing a convolution operation of the neural network layer using a bitwise operation between the feature map bit-serial block and the kernel bit-serial block.

24. The method of claim 23,
    wherein the obtaining of the feature map bit-serial block comprises generating a feature map bit-serial block for each of the bit positions of the elements of the feature map, and
    wherein the obtaining of the kernel bit-serial block comprises generating a kernel bit-serial block for each of the bit positions of the elements of the kernel.

* * * * *